(12) United States Patent
Osaki et al.

(10) Patent No.: US 9,950,768 B2
(45) Date of Patent: Apr. 24, 2018

(54) TOOTHED BELT DRIVING DEVICE FOR BICYCLE

(71) Applicant: Mitsuboshi Belting Ltd., Kobe-shi, Hyogo (JP)

(72) Inventors: Susumu Osaki, Hyogo (JP); Takahide Okazawa, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 110 days.

(21) Appl. No.: 14/915,402

(22) PCT Filed: Aug. 19, 2014

(86) PCT No.: PCT/JP2014/071680
§ 371 (c)(1),
(2) Date: Feb. 29, 2016

(87) PCT Pub. No.: WO2015/029840
PCT Pub. Date: Mar. 5, 2015

(65) Prior Publication Data
US 2016/0221637 A1     Aug. 4, 2016

(30) Foreign Application Priority Data

Aug. 30, 2013 (JP) .................................. 2013-179395

(51) Int. Cl.
*B62M 9/02* (2006.01)
*F16G 1/28* (2006.01)
(Continued)

(52) U.S. Cl.
CPC ................. *B62M 9/02* (2013.01); *F16G 1/14* (2013.01); *F16G 1/28* (2013.01); *F16H 7/02* (2013.01);
(Continued)

(58) Field of Classification Search
CPC .... B62M 9/10; F16G 1/14; F16G 1/28; F16H 7/02; F16H 7/023; F16H 55/38; F16H 55/171
See application file for complete search history.

(56) References Cited

U.S. PATENT DOCUMENTS 4,233,852 A   11/1980  Bruns
4,337,056 A    6/1982  Bruns
(Continued)

FOREIGN PATENT DOCUMENTS

CN      102401104 A    4/2012
EP       0146224 A1    6/1985
(Continued)

OTHER PUBLICATIONS

Sep. 22, 2014—International Search Report—International Application No. PCT/JP2014/071680.
(Continued)

*Primary Examiner* — William E Dondero
*Assistant Examiner* — Robert T Reese
(74) *Attorney, Agent, or Firm* — Banner & Witcoff, Ltd.

(57) ABSTRACT

The present invention relates to a toothed belt driving device for bicycle, in which, in drive state, the pulley groove portion of a driven pulley is in surface contact with a portion of a surface of the belt tooth portion, this portion in surface contact is present in a range positioned closer to a tooth root portion than a reference circle, the maximum value of the shortest distance between the pulley groove portion of the driven pulley and the surface of the belt tooth portion opposite to the traveling direction of the belt is 10% or more and 18% or less of the tooth pitch, a groove depth of the driven pulley is greater than the tooth height of the belt tooth portion, and the difference therebetween is 5% or more of the tooth height.

6 Claims, 9 Drawing Sheets

(51) Int. Cl.
*F16H 55/17* (2006.01)
*F16H 7/02* (2006.01)
*F16G 1/14* (2006.01)
*F16H 55/38* (2006.01)

(52) U.S. Cl.
CPC ........... *F16H 7/023* (2013.01); *F16H 55/171* (2013.01); *F16H 55/38* (2013.01)

(56) References Cited

U.S. PATENT DOCUMENTS

| | | | | |
|---|---|---|---|---|
| 4,468,211 | A * | 8/1984 | Hoshiro | F16G 1/28 474/153 |
| 4,604,080 | A | 8/1986 | Mizuno | |
| 4,915,674 | A * | 4/1990 | Tanaka | F16G 1/28 474/153 |
| 4,929,221 | A * | 5/1990 | Tanaka | F16G 1/28 474/205 |
| 5,405,299 | A | 4/1995 | Kubo et al. | |
| 6,485,384 | B1 * | 11/2002 | Ochiai | B41J 19/005 474/153 |
| 8,312,959 | B1 * | 11/2012 | Schneider | B62D 5/0412 180/443 |
| 9,670,985 | B2 * | 6/2017 | Sekiguchi | F16G 1/10 |
| 2007/0066431 | A1 * | 3/2007 | Hironaka | F16H 7/023 474/205 |
| 2009/0156341 | A1 * | 6/2009 | Gaynor | F16G 1/28 474/153 |
| 2012/0172165 | A1 * | 7/2012 | Schroedl | B62M 9/02 474/160 |
| 2015/0266535 | A1 * | 9/2015 | Marioni | B60K 1/00 180/220 |

FOREIGN PATENT DOCUMENTS

| | | | |
|---|---|---|---|
| GB | 2109503 A * | 6/1983 | ............... F16G 1/28 |
| GB | 2109503 A | 6/1983 | |
| JP | H08-002473 A | 1/1996 | |
| JP | H08-326851 A | 12/1996 | |
| JP | 2001-065648 A | 3/2001 | |
| JP | 2004-278688 A | 10/2004 | |
| JP | 2006-153249 A | 6/2006 | |
| JP | 4340460 B2 | 10/2009 | |

OTHER PUBLICATIONS

May 2, 2017—(CN) Notification of First Office Action—App 201480048040.1.
Jun. 28, 2017—(TW) Office Action—App 103129751.
Mar. 27, 2017—(EP) Extended Search Report—App 14841215.8.
Nov. 1, 2017—(CA) Office Action—App 2,917,984.
Dec. 11, 2017—(KR) Office Action—App 10-2016-7005248.
Dec 28, 2017—(CN) Notification of the Second Office Action—App 201480048040.1.

* cited by examiner

[FIG. 1]

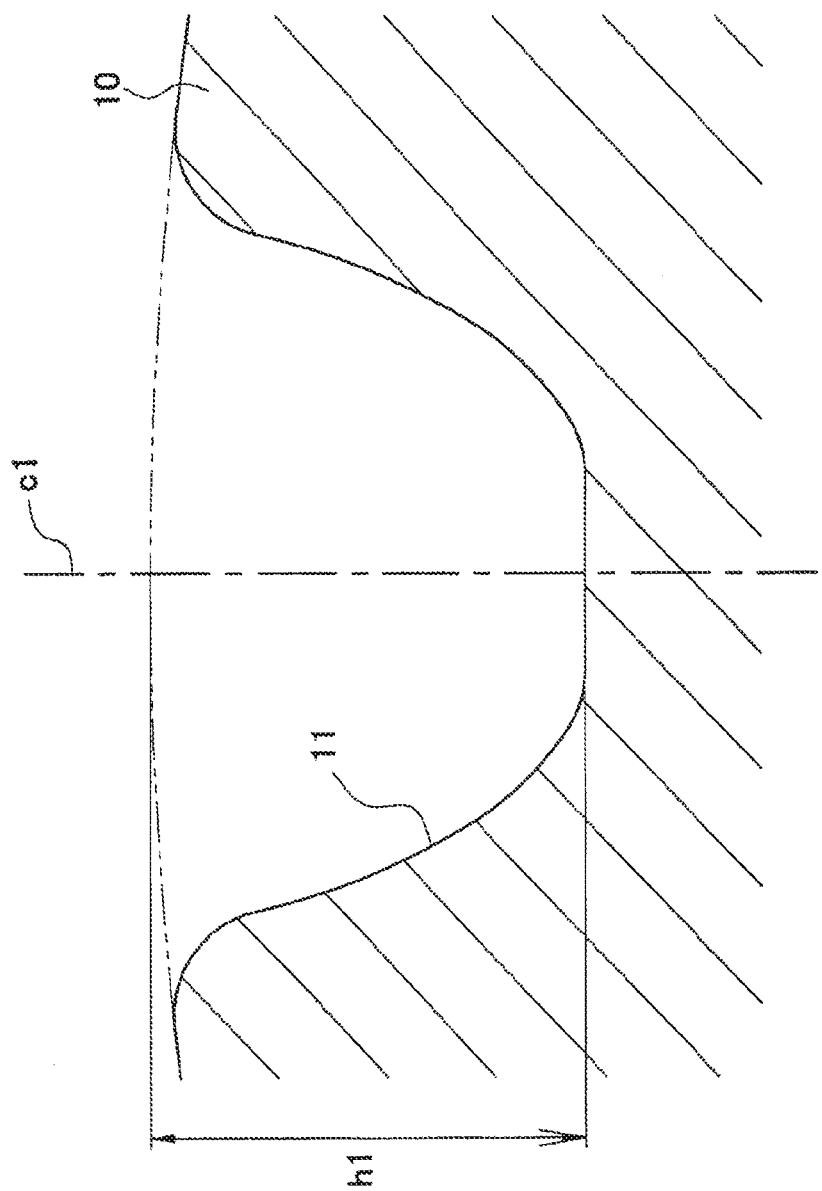

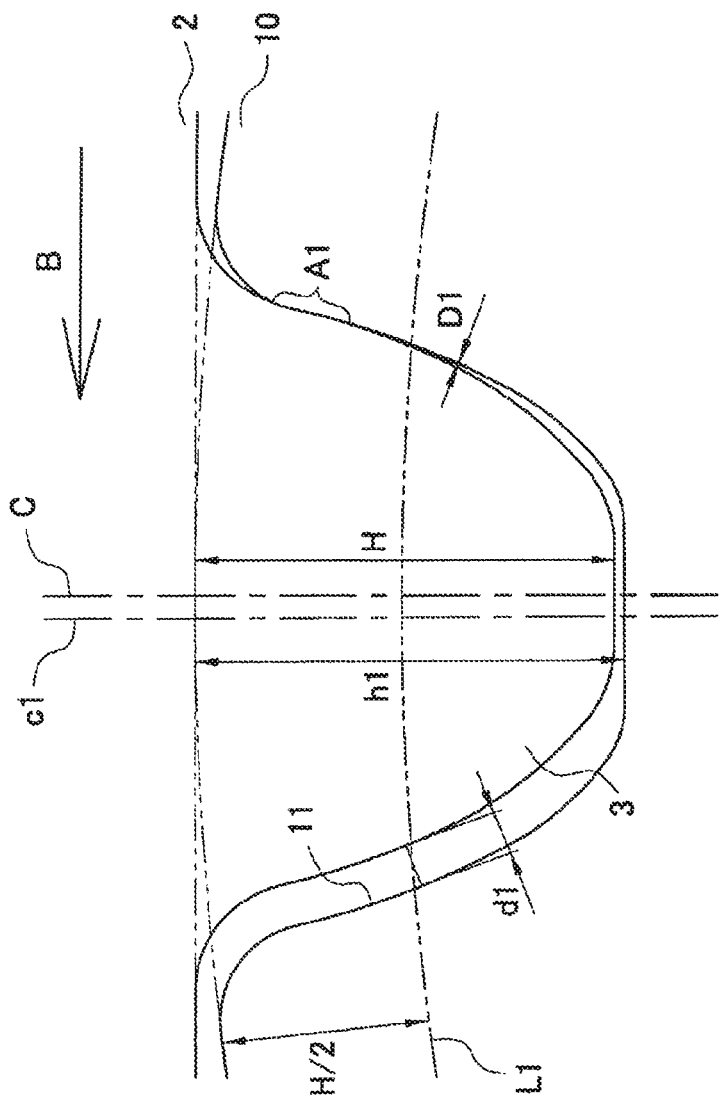
[FIG. 4]

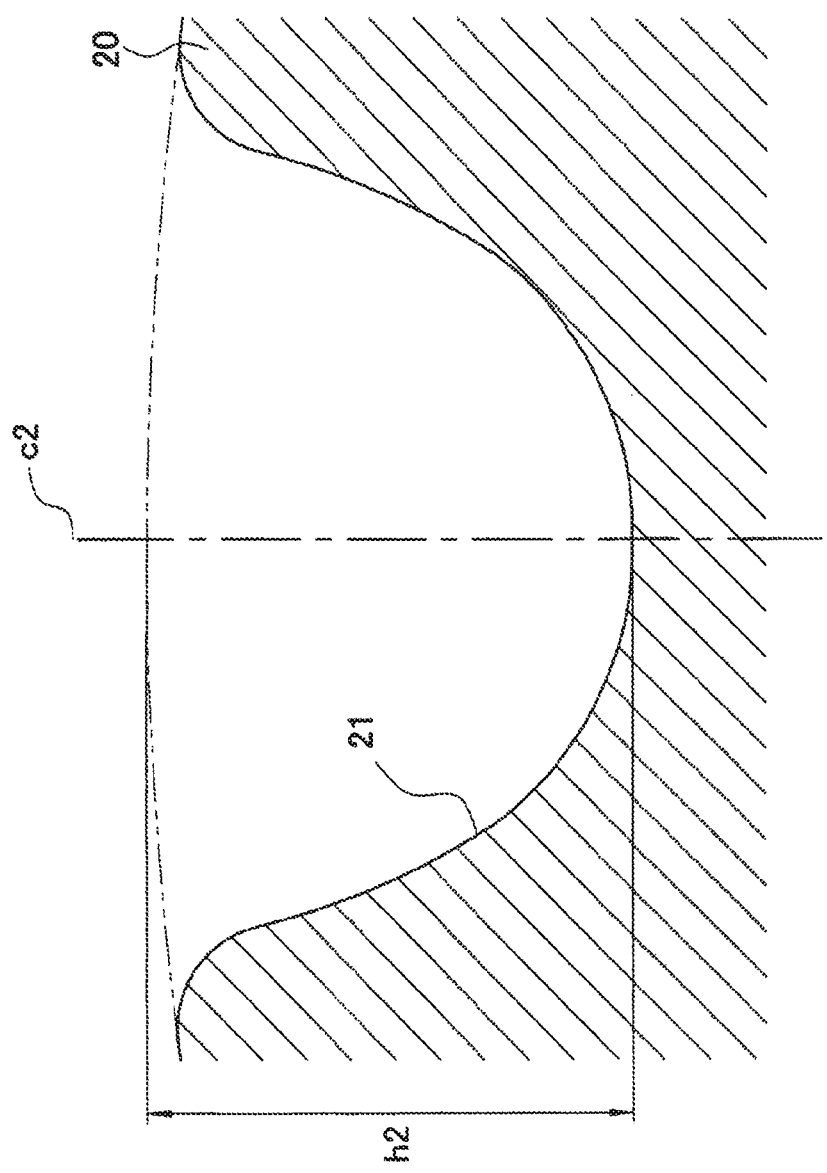
[FIG. 5]

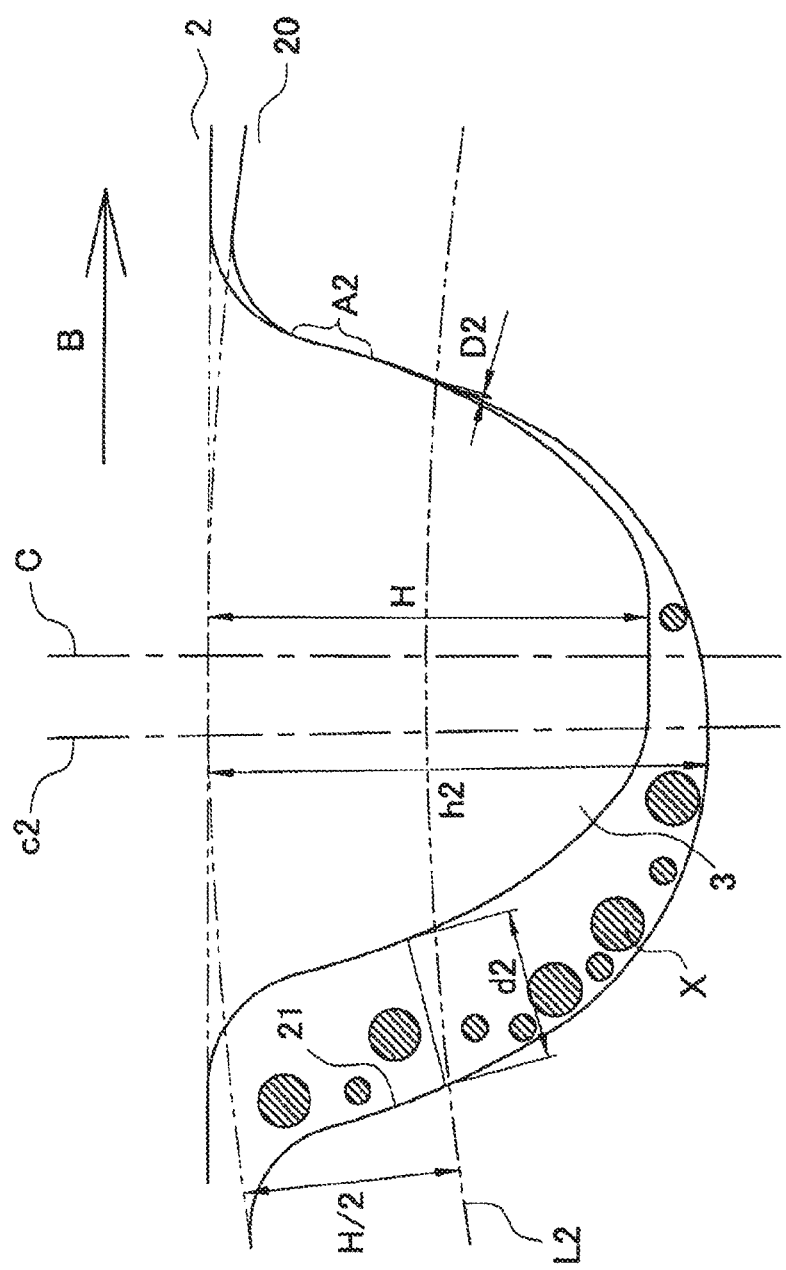
[FIG. 6]

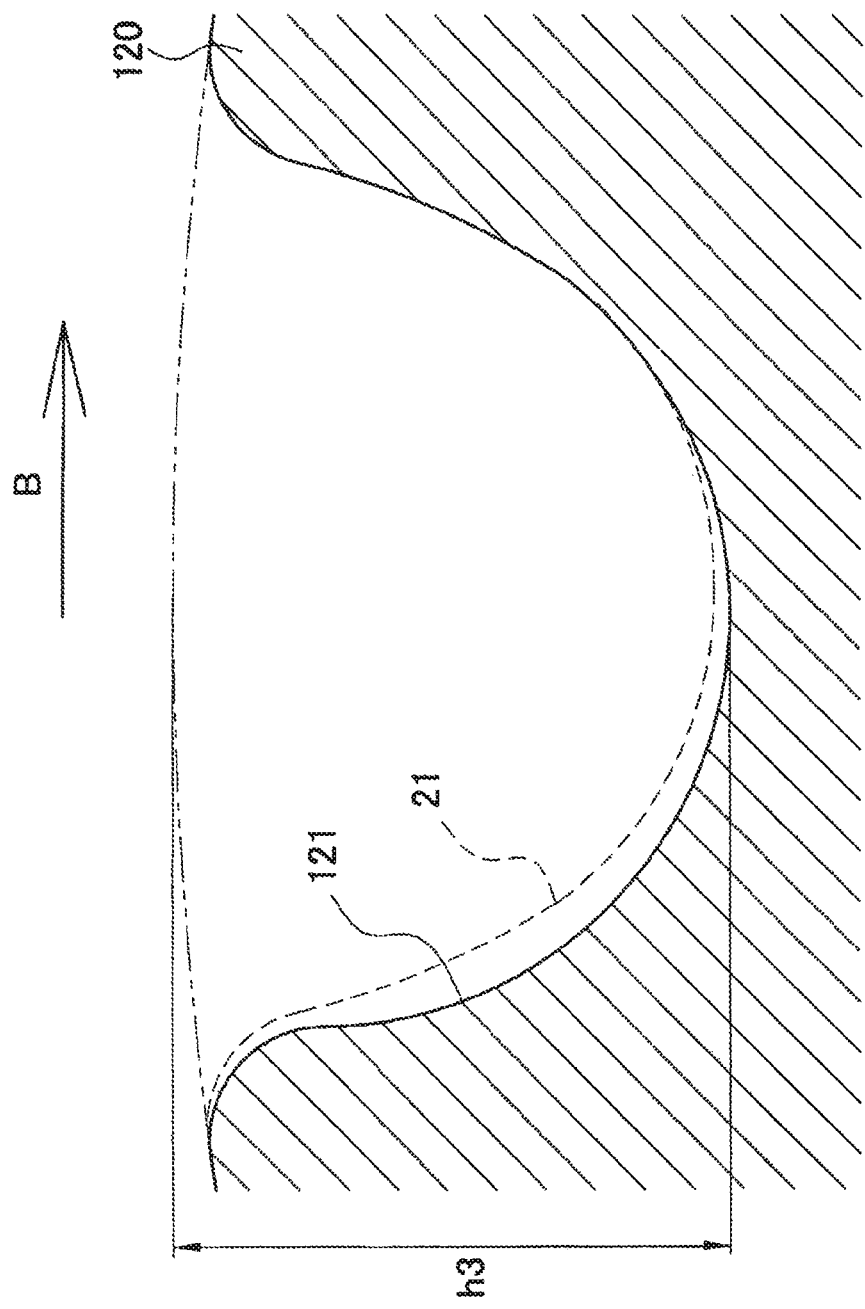

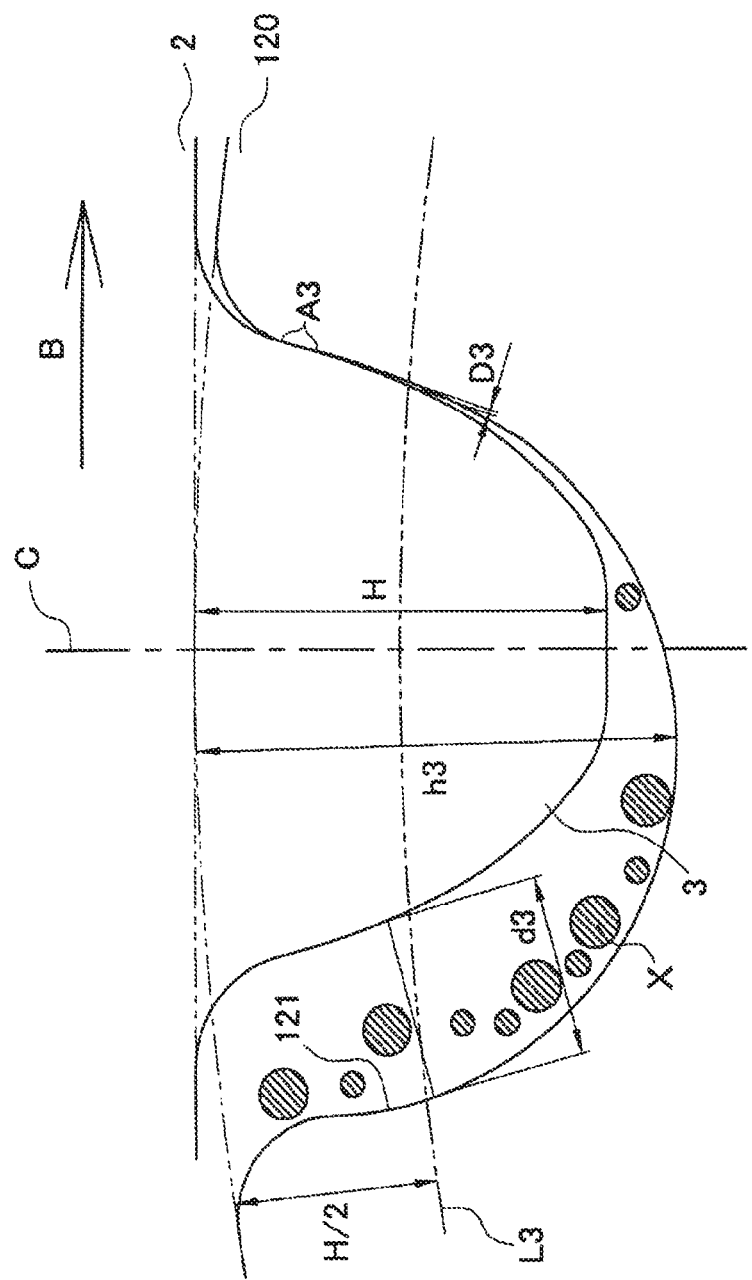

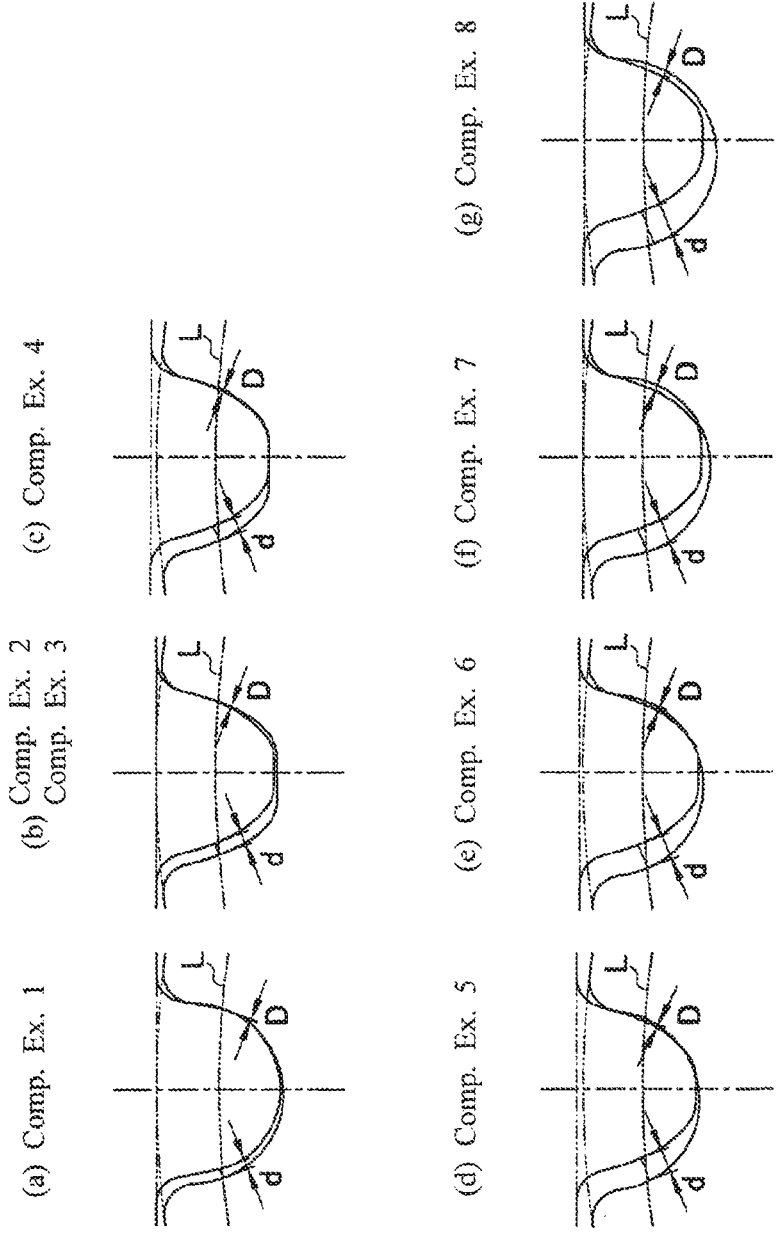
[FIG. 9]

TOOTHED BELT DRIVING DEVICE FOR BICYCLE

CROSS REFERENCE TO RELATED APPLICATIONS

This is a U.S. National Phase Application under 35 U.S.C. § 371 of International Application No. PCT/JP2014/071680, filed Aug. 19, 2014, which claims priority to Japanese Application No. 2013-179395 filed Aug. 30, 2013, the entire disclosures of which are incorporated herein by reference.

TECHNICAL FIELD

The present invention relates to a toothed belt driving device for bicycle used in a belt-driven bicycle.

BACKGROUND ART

Conventionally, as a device for transmitting the rotation of a pedal to a rear wheel of a bicycle, known is a toothed belt driving device containing a drive pulley connected to a rotational shaft of the pedal, a driven pulley connected to a rotational shaft of the rear wheel, and a toothed belt wrapped around these two pulleys. On an inner circumferential surface of the toothed belt are formed convex-shaped belt tooth portions with a predetermined pitch along a belt longitudinal direction. On each of the respective outer circumferential surfaces of the drive pulley and the driven pulley are formed pulley groove portions so as to mesh with the belt tooth portions.

In the case where the outer diameter of the driven pulley is less than that of the drive pulley, belt tension applied to each of the pulley groove portions of the driven pulley is greater than that of the drive pulley. For this reason, when belt tension is suddenly increased due to standing pedaling during riding or the like, and the belt extends partially, the jumping (tooth skipping) of the belt is likely to occur on the driven pulley. In particular, during riding in the rain, the driven pulley may get rain water, and the coefficient of friction between the pulley groove portions and the belt tooth portions decreases. Therefore, jumping is more likely to occur. In order to suppress the occurrence of the jumping of the belt on the driven pulley at the time when belt tension is suddenly increased during riding in the rain, in the toothed belt driving device disclosed in Patent Document 1, the shapes of the pulley groove portion of the driven pulley and the belt tooth portion of the toothed belt have been devised.

PRIOR ART DOCUMENT

Patent Document

Patent Document 1: Japanese Patent No. 4340460

SUMMARY OF THE INVENTION

Problems that the Invention is to Solve

Not only water but also grit may infiltrate into the toothed belt driving device depending on riding conditions. When grit contains water, it easily adheres to the pulley or the belt. In the toothed belt driving device of Patent Document 1, when a mixture of grit and water infiltrates into gaps between the pulley groove portions of the driven pulley and the belt tooth portions, a mixture of grit and water is jammed therebetween. Accordingly, a mixture of grit and water pushes the belt tooth portions in a direction (outward in a pulley radial direction) in which meshing with the pulley groove portions is released, and as a result, jumping of the belt is likely to occur on the driven pulley.

Accordingly, an object of the present invention is to provide a toothed belt driving device for bicycle, which is capable of suppressing the occurrence of the jumping of a belt on a driven pulley and maintaining smooth power transmission performance even under environments in which foreign matter such as a mixture of water and grit adheres.

Means for Solving the Problems

The toothed belt driving device for bicycle according to a first aspect of the present invention is a toothed belt driving device for bicycle containing: a toothed belt that is formed of a rubbery elastic body into which a tension member is embedded along a belt longitudinal direction, and has a plurality of convex-shaped belt tooth portions which disposed with a predetermined tooth pitch along the belt longitudinal direction; a drive pulley having pulley groove portions that are formed on an outer circumferential surface thereof so as to mesh with the belt tooth portions; and a driven pulley having pulley groove portions that are formed on an outer circumferential surface thereof so as to mesh with the belt tooth portions; in which in a cross-section perpendicular to a width direction of the belt, the belt tooth portion is formed to be substantially symmetrical to a straight line in a thickness direction of the belt; in a drive state, the pulley groove portion of the drive pulley is in surface contact with a portion of a surface of the belt tooth portion, which is positioned opposite to a traveling direction of the belt, and the pulley groove portion of the driven pulley is in surface contact with a portion of a surface of the belt tooth portion, which is positioned toward the traveling direction of the belt; in which the portion of the belt tooth portion in surface contact with the pulley groove portion of the drive pulley, and the portion of the belt tooth portion in surface contact with the pulley groove portion of the driven pulley are present in a range positioned closer to a tooth root portion of the belt tooth portion than a reference circle which has a diameter obtained by subtracting the tooth height of the belt tooth portion from the respective outer diameter of the drive pulley and the driven pulley, and is concentric with the respective pulley, and the portion of the belt tooth portion in surface contact with the pulley groove portion of the drive pulley, and the portion of the belt tooth portion in surface contact with the pulley groove portion of the driven pulley are curved in the cross-section perpendicular to the width direction of the belt; in which in a drive state, a gap on the reference circle between the pulley groove portion of the drive pulley and the surface of the belt tooth portion, which is positioned opposite to the traveling direction of the belt, and a gap on the reference circle between the pulley groove portion of the driven pulley and the surface of the belt tooth portion, which is positioned toward the traveling direction of the belt, are 0% or more and 0.5% or less of the tooth pitch of the belt tooth portions; in which in a drive state, the maximum value of the shortest distance between the pulley groove portion of the drive pulley and the surface of the belt tooth portion, which is positioned toward the traveling direction of the belt, is 2% or more and 6% or less of the tooth pitch of the belt tooth portions; in which in a drive state, the maximum value of the shortest distance between the pulley groove portion of the driven pulley and the surface of the belt tooth portion, which is positioned opposite to the traveling direction of the belt, is 10% or more and 18% or less of the tooth pitch of the belt tooth portions; and in which a groove depth of the pulley groove portion of the driven pulley is greater than the tooth height of the belt tooth portion, and the difference therebetween is 5% or more of the tooth height of the belt tooth portion.

In this aspect, the maximum value of the shortest distance between the pulley groove portion of the driven pulley and the surface of the belt tooth portion, which is positioned opposite to a traveling direction of the belt, is large as 10% or more of the tooth pitch. For this reason, in the case where the toothed belt driving device for bicycle is driven under environments in which foreign matter such as a mixture of grit and water adheres thereto, it is capable of preventing the jamming of the foreign matter such as a mixture of grit and water between the pulley groove portion of the driven pulley and the surface of the belt tooth portion, which is positioned opposite to the traveling direction of the belt, and easily discharging the infiltrated foreign matter to the outside. As a result, the occurrence of the jumping of the belt can be suppressed on the driven pulley.

If the maximum value of the shortest distance between the pulley groove portion of the driven pulley and the surface of the belt tooth portion, which is positioned opposite to the traveling direction of the belt, exceeds 18% of the tooth pitch, the width (the width of a pulley tooth portion) between adjacent two pulley groove portions is too narrow. For this reason, durability of the driven pulley is reduced due to wear, and it is not possible to ensure large roundness of the shoulder of the pulley groove portion (the roundness of a tooth tip of the pulley groove portion). Even if it is possible to ensure the roundness of the shoulder of the pulley groove portion, the breakage of tooth portions of the driven pulley is likely to occur. In contrast, in this aspect, the maximum value of the shortest distance between the pulley groove portion of the driven pulley and the surface of the belt tooth portion, which is positioned opposite to the traveling direction of the belt, is 18% or less of the tooth pitch, and thus it is possible to prevent the occurrence of the aforementioned problems.

In a typical toothed belt driving device for bicycle, the drive pulley has a greater outer diameter than the driven pulley, and thus belt tension applied to each of the pulley groove portions of the drive pulley is smaller than that of the driven pulley. For this reason, the jumping of the belt almost does not occur on the drive pulley even under environments in which foreign matter such as a mixture of water and grit adheres thereto. Accordingly, in the drive pulley, unlike the gap between the pulley groove portion of the driven pulley and the surface of the belt tooth portion, which is positioned opposite to a traveling direction of the belt, it is not necessary to ensure a large gap between the pulley groove portion and the surface of the belt tooth portion, which is positioned toward the traveling direction of the belt.

If the maximum value of the shortest distance between the pulley groove portion of the drive pulley and the surface of the belt tooth portion, which is positioned toward a traveling direction of the belt, exceeds 6% of the tooth pitch, problems such as a decrease in power transmission efficiency, the occurrence of vibration or noise, or a decrease in the durability (life) of the toothed belt due to wear may occur. In contrast, in this aspect, the maximum value of the shortest distance between the pulley groove portion of the drive pulley and the surface of the belt tooth portion, which is positioned toward the traveling direction of the belt, is 6% or less of the tooth pitch, and thus it is possible to prevent the occurrence of the aforementioned problems.

In this aspect, the maximum value of the shortest distance between the pulley groove portion of the drive pulley and the surface of the belt tooth portion, which is positioned toward the traveling direction of the belt, is 2% or more of the tooth pitch, and thus the pulley groove portion of the drive pulley is capable of smoothly mesh with the belt tooth portion and smooth power transmission performance can be achieved.

In the case where the groove depth of the pulley groove portion of the driven pulley is greater than the tooth height of the belt tooth portion and the difference therebetween is less than 5%, the occurrence of the jumping of the belt on the driven pulley can be suppressed under environments in which foreign matter such as water and grit does not adhere thereto; but under environments in which foreign matter such as a mixture of grit and water adheres thereto, since the foreign matter such as a mixture of grit and water is jammed between a groove bottom of the pulley groove portion of the driven pulley and a tooth tip of the belt tooth portion, jumping is likely to occur. In contrast, in this aspect, the difference between the groove depth of the pulley groove portion of the driven pulley and the tooth height of the belt tooth portion is 5% or more of the tooth height of the belt tooth portion. For this reason, it is possible to prevent the jamming of the foreign matter such as a mixture of grit and water between the groove bottom of the pulley groove portion of the driven pulley and the tooth tip of the belt tooth portion, and it is possible to suppress the occurrence of jumping.

If the pulley groove portion of each of the drive pulley and the driven pulley or the belt tooth portion has a cross-sectional shape in perpendicular to the width direction of the belt, which includes a straight region in a range positioned closer to the tooth root of the belt tooth portion than the reference circle, the contact between the pulley groove portion and the belt tooth portion is likely to be line contact. In the case where the pulley groove portion of the driven pulley is in line contact with the belt tooth portion, large stress is partially applied to the belt tooth portion, and thus the breakage of teeth is likely to occur during jumping.

In contrast, in this aspect, each of the respective pulley groove portions of the drive pulley and the driven pulley is in surface contact with the belt tooth portion so as to be curved in a cross-section in a range positioned closer to the tooth root than the corresponding reference circle. For this reason, it is possible to prevent the belt tooth portion of the driven pulley from being partially applied large stress. Therefore, it is possible to suppress the occurrence of the breakage of teeth during jumping.

In this aspect, in a drive state, each of the gap on the reference circle between the pulley groove portion of the drive pulley and the surface of the belt tooth portion, which is positioned opposite to the traveling direction of the belt, and the gap on the reference circle between the pulley groove portion of the driven pulley and the surface of the belt tooth portion, which is positioned toward the traveling direction of the belt, is 0% or more and 0.5% or less of the tooth pitch. For this reason, the respective pulley groove portions of the drive pulley and the driven pulley are capable of smoothly meshing with the belt tooth portions, and it is possible to achieve smooth power transmission performance.

The toothed belt driving device for bicycle according to a second aspect of the present invention is that, in the first aspect, in the cross-section perpendicular to the width direction of the belt, the pulley groove portion of the driven pulley is asymmetrical to any straight line of a pulley radial direction.

Due to this configuration, in a drive state, it is possible to ensure a larger maximum value of the shortest distance between the pulley groove portion of the driven pulley and the surface of the belt tooth portion, which is positioned opposite to the traveling direction of the belt, as compared to the case where the pulley groove portion of the driven pulley is symmetrical to a straight line along the pulley radial direction, in the cross-section perpendicular to the width direction of the belt. For this reason, it is possible to prevent foreign matter such as a mixture of grit and water from being fixedly pressed and staying between the pulley groove portion of the driven pulley and the surface of the belt tooth portion, which is positioned opposite to the traveling direction of the belt, and it is easy to quickly discharge the foreign matter to the outside. Accordingly, it is possible to continuously suppress the occurrence of the jumping of the belt on the driven pulley.

The toothed belt driving device for bicycle according to a third aspect of the present invention is that, in the first or second aspect, in a cross-sectional shape perpendicular to the width direction of the belt, a tooth tip of the belt tooth portion is formed linearly to extend in the belt longitudinal direction.

Due to this configuration, in a drive state, it is possible to ensure a larger gap between the groove bottom of the pulley groove portion of the driven pulley and the tooth tip of the belt tooth portion as compared to the case where the tooth tip of the belt tooth portion is formed to have an arc shape bulging outward in the cross-section perpendicular to the width direction of the belt. For this reason, it is possible to more reliably prevent the jamming of foreign matter such as a mixture of grit and water between the groove bottom of the pulley groove portion of the driven pulley and the tooth tip of the belt tooth portion, and it is possible to more reliably suppress the occurrence of jumping.

The toothed belt driving device for bicycle according to a fourth aspect of the present invention is that, in any one of the first to third aspects, the tension member contains a carbon fiber.

Due to this configuration, as compared to the case where aramid fibers are used as the material of the tension member, the tension member has high-strength and high-elasticity, and thus it is possible to suppress the intermediate stretching, and to maintain proper tension. For this reason, it is possible to prevent the occurrence of looseness, flapping or abnormal biting of the toothed belt induced by the stretching. It is possible to suppress the stretching of the toothed belt at low level even if an excessive tension is applied to the toothed belt, and thus it is possible to suppress the occurrence of jumping.

The toothed belt driving device for bicycle according to a fifth aspect of the present invention is that, in any one of the first to fourth aspects, the rubbery elastic body at least contains a thermosetting urethane elastomer.

Due to this configuration, it is possible to easily improve wear resistance of the toothed belt even with a simple configuration in which a toothed surface of the toothed belt is not covered with a tooth cloth. In addition, it is possible to suppress the generation of wear debris.

The toothed belt driving device for bicycle according to a sixth aspect of the present invention is that, in any one of the first to fifth aspects, the rubbery elastic body has a JISA hardness of 90 or higher.

Due to this configuration, the deformation of teeth of the toothed belt is suppressed at low level, and thus it is possible to more reliably suppress the occurrence of jumping.

BRIEF DESCRIPTION OF DRAWINGS

FIG. 3 is a partial enlarged cross-sectional view of a drive pulley in FIG. 1.

FIG. 4 is a partial enlarged cross-sectional view of the drive pulley and the toothed belt of the device of FIG. 1 in a drive state.

FIG. 5 is a partial enlarged cross-sectional view of a driven pulley in FIG. 1.

FIG. 6 is a partial enlarged cross-sectional view of the driven pulley and the toothed belt of the device of FIG. 1 in a drive state.

FIG. 7 is a partial enlarged cross-sectional view of a driven pulley of the toothed belt driving device for bicycle in a second embodiment of the present invention.

FIG. 8 is a partial enlarged cross-sectional view of the driven pulley and the toothed belt of the device of FIG. 7 in a drive state.

FIGS. 9(a) to 9(g) are partial enlarged cross-sectional views of driven pulleys and the toothed belts in Comparative Examples 1 to 8 in a drive state.

MODE FOR CARRYING OUT THE INVENTION

First Embodiment

Hereinafter, a first embodiment of the present invention will be described with reference to drawings.

Figure 1:
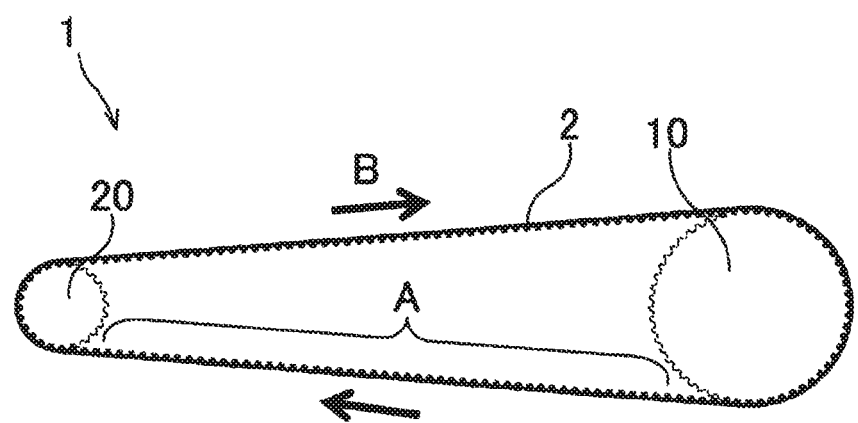
FIG. 1 is a view illustrating the configuration of a toothed belt driving device for bicycle in a first embodiment of the present invention.

As illustrated in FIG. 1, a toothed belt driving device 1 for bicycle in this embodiment contains a drive pulley 10 connected to a rotational shaft of a pedal (not illustrated) of a bicycle; a driven pulley 20 connected to a rotational shaft of a rear wheel (not illustrated) of the bicycle; and an endless toothed belt 2 wrapped around the drive pulley 10 and the driven pulley 20. The toothed belt driving device 1 for bicycle in this embodiment does not have a tension adjustment mechanism that adjusts the tension of the toothed belt 2.

When a rider of the bicycle strokes the pedal and rotates the pedal, the drive pulley 10 rotates, a rotational motion thereof is transmitted to the driven pulley 20 through the toothed belt 2, and the rear wheel rotates.

In the description below, a cross-section perpendicular to a width direction of the belt of the toothed belt driving device 1 for bicycle (cross-section perpendicular to a pulley axial direction) is referred to as a side cross-section.

Figure 2:
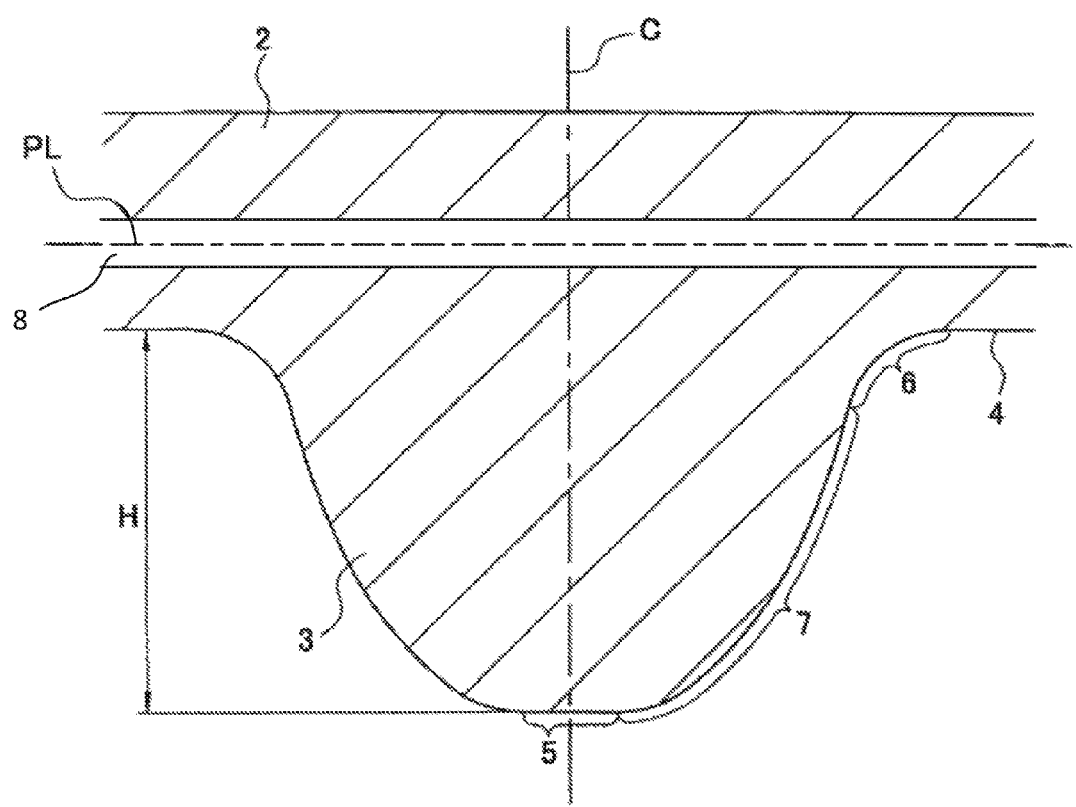
FIG. 2 is a partial enlarged cross-sectional view of a toothed belt in FIG. 1.

As illustrated in FIG. 2, a plurality of convex-shaped belt tooth portions 3 are disposed on an inner circumferential surface of the toothed belt 2 along a belt longitudinal direction with a predetermined tooth pitch. A tooth bottom surface 4, which is substantially parallel to a pitch line PL, is formed between adjacent two belt tooth portions 3.

The toothed belt 2 is formed of a rubbery elastic body into which a tension member 8 is embedded on the pitch line PL. The pitch line PL is a reference line in the belt in the belt longitudinal direction, which maintains a constant length even if the belt is bent. The rubbery elastic body is made of a rubber, an elastomer, a synthetic resin, or the like. The rubbery elastic body preferably contains a thermosetting urethane elastomer. The rubbery elastic body preferably has a JISA hardness of 90 or higher. The JISA hardness was measured according to the JIS K 6253-3: 2012 by using a type A durometer. As the tension member 8, a high-elasticity and high-strength cord is used. The tension member 8 is made of, for example, carbon fibers, aramid fibers, glass fibers, or the like, and is preferably made of carbon fibers. The tension member 8 may undergo an adhesive treatment for the purpose of increasing adhesiveness to the rubbery elastic body. A toothed surface (the inner circumferential surface) of the toothed belt 2 may be covered with a tooth cloth.

A side cross-sectional shape of the toothed belt 2 is constant in the width direction of the belt. In a side cross-section, the belt tooth portion 3 is formed to be substantially symmetrical relative to a belt center line C along a thickness direction of the belt. A tooth pitch represents the distance between the respective belt center lines C of two adjacent belt tooth portions 3.

In the side cross-section, the contour of the belt tooth portion 3 is configured to include a tooth tip portion 5; two tooth root portions 6; and two tooth side portions 7. The tooth root portion 6 is connected to an end portion of the tooth bottom surface 4, and is formed to have a single arc shape (arc shape centered around an arbitrary point). The tooth tip portion 5 is a portion including a tip (tooth apex) of the belt tooth portion 3. The tooth tip portion 5 in this embodiment is formed linearly (substantially parallel to the belt longitudinal direction) to extend in the belt longitudinal direction. The tooth tip portion 5 may be formed to have a single arc shape. The tooth side portion 7 is a portion between the tooth tip portion 5 and the tooth root portion 6. The tooth side portion 7 has a shape obtained by smoothly connecting a plurality of arcs, which is a curved shape bulging outward. The distance between the tip of the belt tooth portion 3 and the tooth bottom surface 4 of the belt tooth portion 3 in the thickness direction of the belt is a tooth height H of the belt tooth portion 3.

The drive pulley 10 is made of a synthetic resin such as polyacetal, nylon, or polypropylene, or metal. The material of the driven pulley 20 is the same as that of the drive pulley 10. As illustrated in FIG. 3, pulley groove portions 11 are formed on an outer circumferential surface of the drive pulley 10 so as to mesh with the belt tooth portions 3.

In a side cross-section, the pulley groove portion 11 is formed symmetrical to a pulley center line c1 along a radial direction of the drive pulley 10. In the side cross-section, the pulley groove portion 11 has a shape obtained by smoothly connecting a plurality of arcs.

A groove depth h1 of the pulley groove portion 11 of the drive pulley 10 is preferably greater than the tooth height H of the belt tooth portion 3, but it may be less than the tooth height H of the belt tooth portion 3. As described above, the jumping of the toothed belt 2 almost does not occur on the drive pulley 10 even under environments in which foreign matter such as a mixture of water and grit adheres thereto. However, wear of the tooth tip portion 5 and the pulley groove portion 11 may be accelerated due to the adhesion of the foreign matter such as a mixture of water and grit. Further, it is necessary to maintain good meshing between the toothed belt 2 and the drive pulley 10. For this reason, it is preferred that the groove depth h1 of the pulley groove portion 11 of the drive pulley 10 is greater than the tooth height H of the belt tooth portion 3. Similar to the driven pulley 20 to be described later, the difference between the groove depth h1 and the tooth height H may be 5% or more of the tooth height H.

As illustrated in FIG. 4, in a drive state, the pulley groove portion 11 of the drive pulley 10 is in surface contact with a portion of a surface of the belt tooth portion 3, which is positioned opposite to a traveling direction (the direction of arrow B in FIG. 4) of the belt. In FIG. 4, the toothed belt 2 and the drive pulley 10 are illustrated in such a manner that hatchings indicating their cross-section are omitted. A portion of the pulley groove portion 11, which is in surface contact with the belt tooth portion 3, is taken as a first power transmission region A1. A circle which has a diameter obtained by subtracting the tooth height H of the belt tooth portion 3 from the outer diameter of the drive pulley 10 and is concentric with the drive pulley 10 is taken as a first reference circle L1.

The first power transmission region A1 is present at a position closer to the tooth root portion 6 than the first reference circle L1. In a side cross-section, the first power transmission region A1 has a shape obtained by connecting a plurality of arcs, or a single arc shape (i.e., a curved shape). The first power transmission region A1 in this embodiment is in contact with a portion of the tooth side portion 7 and a portion of the tooth root portion 6 of the belt tooth portion 3, but may be in contact with only the tooth side portion 7.

In a drive state, a gap (hereinafter, which is referred to as a power transmission side backlash) D1 on the first reference circle L1 between the pulley groove portion 11 of the drive pulley 10 and the surface of the belt tooth portion 3, which is positioned opposite to the traveling direction of the belt, is 0.5% or less of the tooth pitch. The gap D1 may not be provided (may be 0% of the tooth pitch). In a drive state, the maximum value (hereinafter, which is referred to as a non-power transmission side backlash) d1 of the shortest distance between the pulley groove portion 11 of the drive pulley 10 and a surface of the belt tooth portion 3, which is positioned toward the travel direction of the belt, is 2% or more and 6% or less of the tooth pitch.

As illustrated in FIG. 5, pulley groove portions 21 are formed on an outer circumferential surface of the driven pulley 20 so as to mesh with the belt tooth portions 3. The outer diameter of the driven pulley 20 is less than that of the drive pulley 10. The number of pulley grooves 21 of the driven pulley 20 is within the range of those of typical toothed belt driving device for bicycles, and for example, is 22 to 29. The ratio of the outer diameters (ratio between the number of grooves) of the driven pulley 20 to the drive pulley 10 is within the range of those of typical toothed belt driving device for bicycles, and for example, is 1.7 to 3.2.

In the side cross-section, the pulley groove portion 21 is formed symmetrical to a pulley center line c2 along a radial direction of the driven pulley 20. In the side cross-section, the pulley groove portion 21 has a shape obtained by smoothly connecting a plurality of arcs.

A groove depth h2 of the pulley groove portion 21 of the driven pulley 20 is greater than the tooth height H of the belt tooth portion 3. The difference therebetween is 5% or more of the tooth height H.

As illustrated in FIG. 6, in a drive state, the pulley groove portion 21 of the driven pulley 20 is in surface contact with a portion of a surface of the belt tooth portion 3, which is positioned toward the traveling direction (the direction of arrow B in FIG. 6) of the belt. In FIG. 6, the toothed belt 2 and the driven pulley 20 are illustrated in such a manner that hatchings indicating their cross-section are omitted. A portion of the pulley groove portion 21, which is in surface contact with the belt tooth portion 3, is taken as a second power transmission region A2. A circle which has a diameter obtained by subtracting the tooth height H of the belt tooth portion 3 from the outer diameter of the driven pulley 20 and is concentric with the driven pulley 20 is taken as a second reference circle L2.

The second power transmission region A2 is present at a position closer to the tooth root portion 6 than the second reference circle L2. In a side cross-section, the second power transmission region A2 has a shape obtained by connecting a plurality of arcs, or a single arc shape (i.e., a curved shape). The second power transmission region A2 in this embodiment is in contact with a portion of the tooth side portion 7 and a portion of the tooth root portion 6 of the belt tooth portion 3, but may be in contact with only the tooth side portion 7. The length of the second power transmission region A2 in a pulley radial direction (the thickness direction of the belt) is preferably 10% or more and 50% or less of the tooth height H.

In a drive state, a gap (hereinafter, which is referred to as a power transmission side backlash) D2 on the second reference circle L2 between the pulley groove portion 21 of the driven pulley 20 and the surface of the belt tooth portion 3, which is positioned toward the traveling direction of the belt, is 0.5% or less of the tooth pitch. The gap D2 may not be provided (may be 0% of the tooth pitch). In a drive state, the maximum value (hereinafter, which is referred to as a non-power transmission side backlash) d2 of the shortest distance between the pulley groove portion 21 of the driven pulley 20 and a surface of the belt tooth portion 3, which is positioned opposite to the travel direction of the belt, is 10% or more and 18% or less of the tooth pitch. The position, at which the shortest distance between the pulley groove portion 21 of the driven pulley 20 and the surface of the belt tooth portion 3, which is positioned opposite to the travel direction of the belt, is the maximum, is closer to the second reference circle L2 than a circle passing through the tooth tip portion of the belt tooth portion 3.

In the toothed belt driving device 1 for bicycle according to this embodiment, the non-power transmission side backlash d2 of the driven pulley 20 is large as 10% or more of the tooth pitch. For this reason, in the case where the toothed belt driving device 1 for bicycle is driven under environments in which foreign matter X such as a mixture of grit and water adheres thereto, it is capable of preventing the jamming of the foreign matter X such as a mixture of grit and water between the pulley groove portion 21 of the driven pulley 20 and the surface of the belt tooth portion 3, which is positioned opposite to the traveling direction of the belt, and easily discharging the infiltrated foreign matter X. As a result, the occurrence of the jumping of the belt on the driven pulley 20 can be suppressed.

In the case where the non-power transmission side backlash d2 of the driven pulley 20 exceeds 18% of the tooth pitch, the width (the width of a pulley tooth portion) between adjacent two pulley groove portions 21 is too narrow. For this reason, durability of the driven pulley 20 is reduced due to wear, and it is not possible to ensure large roundness of the shoulder of the pulley groove portion 21. Even if it is possible to ensure the roundness of the shoulder of the pulley groove portion 21, tooth portions of the driven pulley are likely to be broken. In contrast, in this embodiment, the non-power transmission side backlash d2 of the driven pulley 20 is 18% or less of the tooth pitch, and thus it is possible to prevent the occurrence of the aforementioned problems.

In the case where the groove depth h2 of the pulley groove portion 21 of the driven pulley 20 is greater than the tooth height H of the belt tooth portion 3 and the difference therebetween is less than 5%, the occurrence of the jumping of the belt on the driven pulley 20 can be suppressed under environments in which foreign matter X such as water and grit does not adhere thereto, but under environments in which the foreign matter X such as a mixture of grit and water adheres thereto, the jumping is likely to occur since the foreign matter X is jammed between the groove bottom of the pulley groove portion of the driven pulley and the tooth tip of the belt tooth portion. In contrast, in this embodiment, the difference between the groove depth h2 of the pulley groove portion 21 of the driven pulley 20 and the tooth height H of the belt tooth portion 3 is 5% or more of the tooth height H. For this reason, it is possible to prevent the jamming of the foreign matter X such as a mixture of grit and water between the groove bottom of the pulley groove portion 21 of the driven pulley 20 and the tooth tip of the belt tooth portion 3, and it is possible to suppress the occurrence of jumping.

In the case where the pulley groove portion of each of the drive pulley and the driven pulley or the belt tooth portion has a cross-sectional shape perpendicular to the width direction of the belt, which include a straight region in a range positioned closer to the tooth root of the belt tooth portion than the reference circle, the contact between the pulley groove portion and the belt tooth portion is likely to be line contact. In the case where the pulley groove portion of the driven pulley is in line contact with the belt tooth portion, large stress is partially applied to the belt tooth portion, and thus the breakage of teeth is likely to occur during jumping.

In contrast, in this embodiment, each of the pulley groove portions 11 and 12 of the drive pulley 10 and the driven pulley 20, respectively, is in surface contact with the belt tooth portion 3 so as to be curved in a cross-section in a range positioned closer to the tooth root than the reference circles L1 and L2, respectively. For this reason, it is possible to prevent the belt tooth portion 3 of the driven pulley 20 from being partially applied large stress. Therefore, it is possible to suppress the occurrence of the breakage of teeth during jumping.

In this embodiment, in a drive state, each of the power transmission side backlash D1 of the drive pulley 10 and the power transmission side backlash D2 of the driven pulley 20 is 0% or more and 0.5% or less of the tooth pitch. For this reason, each of the pulley groove portions 11 and 12 of the drive pulley 10 and the driven pulley 20 is capable of smoothly meshing with the belt tooth portions 3, and it is possible to achieve smooth power transmission performance.

Since the drive pulley 10 has a greater diameter than that of the driven pulley 20, belt tension applied to each of the pulley groove portions of the drive pulley 10 is smaller than that of the driven pulley 20. For this reason, the jumping of the belt almost does not occur on the drive pulley 10 even under environments in which foreign matter X such as a mixture of water and grit adheres thereto. Accordingly, unlike the driven pulley 20, it is not necessary to ensure a large non-power transmission side backlash in the drive pulley 10.

In the case where the drive pulley 10 has the non-power transmission side backlash d1 exceeding 6% of the tooth pitch, problems such as a decrease in power transmission efficiency, the occurrence of vibration or noise, or a decrease in the durability (life) of the toothed belt due to wear may occur. In contrast, in this embodiment, the non-power transmission side backlash d1 of the drive pulley 10 is 6% or less of the tooth pitch, and thus it is possible to prevent the occurrence of the aforementioned problems.

In this embodiment, the non-power transmission side backlash d1 of the drive pulley 10 is 2% or more of the tooth pitch, and thus the pulley groove portion 11 of the drive pulley 10 is capable of smoothly mesh with the belt tooth portion 3, and it is possible to achieve smooth power transmission performance.

In this embodiment, in the side cross-section, the tooth tip portion 5 of the belt tooth portion 3 is formed linearly (substantially parallel to the belt longitudinal direction) to extend in the belt longitudinal direction. Accordingly, in a drive state, it is possible to ensure a large gap between the groove bottom of the pulley groove portion 21 of the driven pulley 20 and the tooth tip of the belt tooth portion 3 as compared to the case where the tooth tip portion of the belt tooth portion 3 is formed to have an arc shape bulging outward in the side cross-section. For this reason, it is possible to more reliably prevent the jamming of foreign matter X such as a mixture of grit and water between the groove bottom of the pulley groove portion 21 of the driven pulley 20 and the tooth tip of the belt tooth portion 3, and it is possible to more reliably suppress the occurrence of jumping.

In the case where the rubbery elastic body constituting the toothed belt 2 contains a thermosetting urethane elastomer, it is possible to easily improve wear resistance of the toothed belt even with a simple configuration in which a toothed surface of the toothed belt is not covered with a tooth cloth. In addition, it is possible to suppress the occurrence of wear debris.

In the case where the rubbery elastic body constituting the toothed belt 2 has a JISA hardness of 90 or higher, the deformation of teeth of the toothed belt is suppressed at low level, and thus it is possible to suppress the occurrence of jumping.

Second Embodiment

Hereinafter, a second embodiment of the present invention will be described. For the same configuration elements as in the first embodiment is used the same reference signs and descriptions thereof will be appropriately omitted.

The toothed belt driving device for bicycle in this embodiment contains a driven pulley 120 different from the driven pulley 20 in the first embodiment, and the drive pulley 10 and the toothed belt 2 which are the same as in the first embodiment.

As illustrated in FIG. 7, pulley groove portions 121 are formed on an outer circumferential surface of the driven pulley 120 so as to mesh with the belt tooth portions 3. In FIG. 7, the driven pulley 20 in the first embodiment is illustrated by the dotted line. The outer diameter of the driven pulley 120 and the number of the pulley groove portions 121 are the same as those of the driven pulley 20 in the first embodiment.

In a side cross-section, the pulley groove portion 121 is formed asymmetrical to any straight line of a radial direction of the driven pulley 120. In the side cross-section, the pulley groove portion 121 has a shape obtained by smoothly connecting a plurality of arcs.

A groove depth h3 of the pulley groove portion 121 of the driven pulley 120 is greater than the tooth height H of the belt tooth portion 3. The difference therebetween is 5% or more of the tooth height H. The groove depth h3 of the pulley groove portion 121 is greater than the groove depth h2 of the pulley groove portion 21 of the driven pulley 20 in the first embodiment.

The pulley groove portion 121 has a rotation direction (the direction of arrow B in FIG. 7) side surface which has substantially the same shape as the rotation direction side surface of the pulley groove portion 21 in the first embodiment. A surface, which is positioned opposite to the rotation direction, of the pulley groove portion 121 is formed on more outside than the rotation direction-opposite side surface of the pulley groove portion 21 in the first embodiment. Accordingly, the groove width of the pulley groove portion 121 is greater than the groove width of the pulley groove portion 21.

As illustrated in FIG. 8, in a drive state, the pulley groove portion 121 of the driven pulley 120 is in surface contact with a portion of the surface of the belt tooth portion 3, which is positioned toward the traveling direction (the direction of arrow B in FIG. 8) of the belt. In FIG. 8, the toothed belt 2 and the driven pulley 120 are illustrated in such a manner that hatchings indicating their cross-section are omitted. A portion of the pulley groove portion 121, which is in surface contact with the belt tooth portion 3, is taken as a third power transmission region A3. A circle which has a diameter obtained by subtracting the tooth height H of the belt tooth portion 3 from the outer diameter of the driven pulley 120 and is concentric with the driven pulley 120 is taken as a third reference circle L3. The third reference circle L3 has the same diameter as that of the second reference circle L2.

The third power transmission region A3 is present at a position closer to the tooth root portion 6 than the third reference circle L3. In a side cross-section, the third power transmission region A3 has a shape obtained by connecting a plurality of arcs, or a single arc shape (i.e., a curved shape). The third power transmission region A3 in this embodiment is in contact with a portion of the tooth side portion 7 and a portion of the tooth root portion 6 in the belt tooth portion 3, but may be in contact with only the tooth side portion 7. The length of the third power transmission region A3 in the pulley radial direction (the thickness direction of the belt) is preferably 10% or more and 50% or less of the tooth height H.

In a drive state, a gap (hereinafter, which is referred to as a power transmission side backlash) D3 on the third reference circle L3 between the pulley groove portion 121 of the driven pulley 120 and the surface of the belt tooth portion 3, which is positioned toward the traveling direction of the belt, is 0.5% or less of the tooth pitch. The gap D3 may not be provided (may be 0% of the tooth pitch). In a drive state, the maximum value (hereinafter, which is referred to as a non-power transmission side backlash) d3 of the shortest distance between the pulley groove portion 121 of the driven pulley 120 and the surface of the belt tooth portion 3, which is positioned opposite to the travel direction of the belt, is 10% or more and 18% or less of the tooth pitch. The position, at which the shortest distance between the pulley groove portion 121 of the driven pulley 120 and the surface of the belt tooth portion 3, which is positioned opposite to the travel direction of the belt, is the maximum, is closer to the third reference circle L3 than a circle passing through the tooth tip portion of the belt tooth portion 3.

According to the toothed belt driving device for bicycle in this embodiment, it is possible to achieve the following effects in addition to the effects described in the first embodiment.

In this embodiment, in the side cross-section, the pulley groove portion 121 of the driven pulley 120 is asymmetrical to any straight line in the pulley radial direction. Accordingly, in the side cross-section, it is possible to ensure the large non-power transmission side backlash d3 of the driven pulley 120 in a drive state, as compared to the case where the pulley groove portion of the driven pulley 120 is symmetrical to a straight line along the pulley radial direction. For this reason, it is possible to prevent the foreign matter X such as a mixture of grit and water from being fixedly pressed and staying between the pulley groove portion 121 of the driven pulley 120 and the surface of the belt tooth portion 3, which is positioned opposite to the traveling direction of the belt, and it is easy to quickly discharge the foreign matter X to the outside. Accordingly, it is possible to continuously suppress the occurrence of the jumping of the belt on the driven pulley 120.

The preferred embodiments of the present invention have been described above, but the present invention is not limited to these embodiments, and various forms of modifications can be made within described in the scope of claims.

EXAMPLES

Hereinafter, specific Examples and Comparative Examples of the present invention will be described.

Example 1

In Example 1, used were a drive pulley, a driven pulley and a toothed belt, which are the same as in the toothed belt driving device for bicycle according to the first embodiment illustrated in FIG. 1 to FIG. 6. The number of pulley groove portions of the drive pulley is 55, the number of the pulley groove portions of the driven pulley is 25, and a ratio in the number of grooves is 2.2. The drive pulley and the driven pulley are made of a steel material. The groove depth of the pulley groove portion of the drive pulley is 3.45 mm. The groove depth (Hp) of the pulley groove portion of the driven pulley is as shown in Table 1. The same drive pulley as in Example 1 was used as a drive pulley in each of Example 2 and Comparative Examples 2 to 8 which will be described later. The material and the number of grooves of pulley groove portions of the driven pulley used in Example 2 and Comparative Examples 2 to 8 which will be described later, are the same as that of the driven pulley in Example 1.

TABLE 1

| | tension member | groove depth Hp (mm) | tooth height Hb (mm) | Hp − Hb (mm) | (Hp − Hb)/Hb (%) | power transmission side backlash D (%) | non-power transmission side backlash d (%) |
|---|---|---|---|---|---|---|---|
| Comp. Ex. 1 | aramid | 3.65 | 3.56 | 0.09 | 2.5 | 0.31 | 3.49 |
| Comp. Ex. 2 | aramid | 3.45 | 3.40 | 0.05 | 1.5 | 0.26 | 4.52 |
| Comp. Ex. 3 | carbon | 3.45 | 3.40 | 0.05 | 1.5 | 0.26 | 4.52 |
| Comp. Ex. 4 | carbon | 2.95 | 3.40 | −0.45 | −13.2 | 0.51 | 5.65 |
| Comp. Ex. 5 | carbon | 3.30 | 3.40 | −0.10 | −2.9 | 1.17 | 8.81 |
| Comp. Ex. 6 | carbon | 3.45 | 3.40 | 0.05 | 1.5 | 1.26 | 9.38 |
| Comp. Ex. 7 | carbon | 3.65 | 3.40 | 0.25 | 7.4 | 1.98 | 10.46 |
| Comp. Ex. 8 | carbon | 3.80 | 3.40 | 0.40 | 11.8 | 2.04 | 12.73 |
| Ex. 1 | carbon | 3.84 | 3.40 | 0.44 | 12.9 | 0.26 | 14.42 |
| Ex. 2 | carbon | 3.80 | 3.40 | 0.40 | 11.8 | 0.39 | 17.9 |

| | state of contact | shape of pulley | no-water/grit jumping torque T₁ (N·m) | water/grit jumping torque T₂ (N·m) | decrease rate of jumping torque (%) | breakage of teeth |
|---|---|---|---|---|---|---|
| Comp. Ex. 1 | surface contact | symmetrical | 108.7 | 92.5 | 14.9 | no breakage |
| Comp. Ex. 2 | surface contact | symmetrical | 94.9 | 84.5 | 11 | no breakage |
| Comp. Ex. 3 | surface contact | symmetrical | 137.1 | 122.2 | 10.9 | no breakage |
| Comp. Ex. 4 | surface contact | symmetrical | 117.3 | 102.9 | 12.3 | no breakage |
| Comp. Ex. 5 | line contact | symmetrical | 125.2 | 117.3 | 6.3 | breakage |
| Comp. Ex. 6 | line contact | symmetrical | 133.2 | 126 | 5.4 | breakage |
| Comp. Ex. 7 | line contact | symmetrical | 136 | 133.6 | 1.8 | breakage |
| Comp. Ex. 8 | line contact | symmetrical | 136.6 | 137.1 | 0 | breakage |

TABLE 1-continued

| | | | | | | |
|---|---|---|---|---|---|---|
| Ex. 1 | surface contact | symmetrical | 136.5 | 138.1 | 0 | no breakage |
| Ex. 2 | surface contact | asymmetrical | 137.1 | 138.5 | 0 | no breakage |

The specifications of the toothed belt in Example 1 are as described below. The same toothed belt as in Example 1 was used as a toothed belt in each of Example 2 and Comparative Examples 3 to 8 which will be described later.

Belt width: 15 mm
Tooth pitch: 8 mm
Tooth height (Hb): 3.4 mm
Length of pitch circle (length on pitch line): 1200 mm
Number of teeth: 150
Rubbery elastic body: thermosetting urethane elastomer, JISA hardness 95
Tension member: carbon fibers, diameter 0.9 mm In Example 1, during the traveling of the belt, a power transmission side backlash of the drive pulley is 0.26% of the tooth pitch, and a non-power transmission side backlash is 4.52% of the tooth pitch. During the traveling of the belt, the ratio of each of a power transmission side backlash D and a non-power transmission side backlash d of the driven pulley to the tooth pitch is as shown in Table 1.

Example 2

In Example 2, the driven pulley in the second embodiment illustrated in FIG. 7 and FIG. 8 was used. The groove depth (Hp) of the pulley groove portion of the driven pulley is as shown in Table 1. During the traveling of the belt, the ratio of each of the power transmission side backlash D and the non-power transmission side backlash d of the driven pulley to the tooth pitch is as shown in Table 1.

Comparative Example 1

As Comparative Example 1, a drive pulley, a driven pulley and a toothed belt, which are the same as those disclosed in Patent Document 1 (JP Patent No. 4340460), were used. (a) of FIG. 9 illustrates a partial enlarged cross-sectional view of the driven pulley and the toothed belt in Comparative Example 1 during the traveling of the belt. The number of grooves of the pulley groove portions of the drive pulley is 55, the number of grooves of the pulley groove portions of the driven pulley is 25, and a ratio in the number of grooves is 2.2. The groove depth of the pulley groove portion of the drive pulley 3.65 mm. The groove depth (Hp) of the pulley groove portion of the driven pulley is as shown in Table 1.

The toothed belt in Comparative Example 1 has the same specifications as those of the toothed belt of each of Examples 1 and 2 and Comparative Examples 2 to 8 to be described later except for the material of the tension member, the tooth height (Hb) of the belt tooth portion, and the shape of the belt tooth portion. In Comparative Example 1, the material of the tension member is an aramid fiber, and the tooth height (Hb) of the belt tooth portion is 3.56 mm. As illustrated in (a) of FIG. 9, the tooth tip of the toothed belt in Comparative Example 1 is formed to have an arc-shape in a cross-section.

In Comparative Example 1, during the traveling of the belt, a power transmission side backlash of the drive pulley is 0.31% of the tooth pitch, and a non-power transmission side backlash is 3.49% of the tooth pitch. During the traveling of the belt, the ratio of each of the power transmission side backlash D and the non-power transmission side backlash d of the driven pulley to the tooth pitch is as shown in Table 1. In Comparative Example 1, during the traveling of the belt, the pulley groove portion of the driven pulley is in surface contact with a surface of the tooth portion of the toothed belt, which is positioned toward the traveling direction, so as to be curved in a cross-section.

Comparative Example 2

(b) of FIG. 9 illustrates a partial enlarged cross-sectional view of the driven pulley and the toothed belt in Comparative Example 2 during the traveling of the belt. In Comparative Example 2, the toothed belt has the same configuration as that of the toothed belt in Example 1 except that the tension member is made of an aramid fiber. In Comparative Example 2, the groove depth of the pulley groove portion of the driven pulley, and the ratio of each of the power transmission side backlash D and the non-power transmission side backlash d of the driven pulley to the tooth pitch during the traveling of the belt are as shown in Table 1. In Comparative Example 2, during the traveling of the belt, the pulley groove portion of the driven pulley is in surface contact with a surface of the tooth portion of the toothed belt, which is positioned toward the traveling direction, so as to be curved in a cross-section.

Comparative Examples 3 to 8

(b) of FIG. 9 to (g) of FIG. 9 illustrate partial cross-sectional views of the driven pulleys and the toothed belts in Comparative Examples 3 to 8 during the traveling of the belt, respectively. In Comparative Examples 3 to 8, the groove depth of the pulley groove portion of the driven pulley, and the ratio of each of the power transmission side backlash D and the non-power transmission side backlash d of the driven pulley to the tooth pitch during the traveling of the belt are as shown in Table 1. In Comparative Examples 3 and 4, during the traveling of the belt, the pulley groove portion of the driven pulley is in surface contact with a surface of the tooth portion of the toothed belt, which is positioned toward the traveling direction, so as to be curved in a cross-section. In Comparative Examples 5 to 8, the pulley groove portion of the driven pulley has non-similar shape to a surface of the tooth portion of the toothed belt, which is positioned toward the traveling direction. During the traveling of the belt, the pulley groove portion of the driven pulley is in line contact with the surface of the tooth portion of the toothed belt, which is positioned toward the traveling direction, at the point outside of a reference circle L which has a diameter obtained by subtracting the tooth height from the outer diameter of the driven pulley and is concentric with the driven pulley.

Examples 1 and 2 and Comparative Examples 1 to 8 were subjected to jumping tests under conditions in which there was no foreign matter, and under conditions in which a mixture of water and grit adhered thereto.

In the jumping tests under conditions in which there was no foreign matter, first, the toothed belt was wrapped around the drive pulley and the driven pulley, the shaft-to-shaft distance between the pulleys was adjusted in order for belt tension to be 300 N, and then the drive pulley was rotated at 500 rpm. Thereafter, load torque applied to a driven shaft was continuously increased, and the load torque applied to the driven shaft at the occurrence of jumping was taken as "no-water/grit jumping torque $T_1$". Results are shown in Table 1.

Similar to the jumping tests under conditions in which there was no foreign matter, the shaft-to-shaft distance between the pulleys was adjusted in order for belt tension to be 300 N, a mixture of grit and water prepared by measuring them at a volume ratio of 1:1 and mixing was mounted on the entirety (range A in FIG. 1) of a toothed surface of the toothed belt to be wound around the driven pulley in such a way that the tooth root of the belt could not be seen, and then the drive pulley was rotated (500 rpm). Silica sand #6 (particle size: from 0.2 to 0.4 mm) was used as grit. Thereafter, load torque applied to the driven shaft was continuously increased and the load torque applied to the driven shaft at the occurrence of jumping was taken as "water/grit jumping torque $T_2$". After the tests were completed, the presence or absence of the breakage of teeth of the toothed belt was observed. The results are shown in Table 1. The decrease ratio (($T_1-T_2$)/$T_1$) (hereinafter, which is referred to as a decrease ratio of jumping torque) of the "water/grit jumping torque $T_2$" to the "no-water/grit jumping torque $T_1$" is also shown in Table 1.

As being apparent from Table 1, in Comparative Examples 1 to 7, the decrease ratios of jumping torque are greater than zero. That is, jumping is likely to occur due to the adhesion of foreign matter. In contrast, in Comparative Example 8 and Examples 1 and 2, the decrease ratios of jumping torque are zero. That is, it is understood that the occurrence of jumping induced by the adhesion of foreign matter can be suppressed.

In Comparative Example 8 in which the pulley groove portion of the driven pulley is in line contact with the belt tooth portion, the breakage of teeth occurs. In contrast, in Examples 1 and 2 in which the pulley groove portion of the driven pulley is in surface contact with the belt tooth portion, the breakage of teeth of the toothed belt does not occur. It is considered that the reason for this is that since the pulley groove portion of the driven pulley is in surface contact with the belt tooth portion, it is possible to prevent the partial application of large stress to the toothed belt.

Only the material of the tension member is different between Comparative Examples 2 and 3. In Comparative Example 2, an aramid fiber is used, and whereas in Comparative Example 3, a carbon fiber is used.

Comparing the test results of Comparative Examples 2 and 3 with each other, both of the "no-water/grit jumping torque $T_1$" and the "water/grit jumping torque $T_2$" in Comparative Example 3 are greater than those in Comparative Example 2. From these results, it is understood that carbon fibers used as the tension member contributes to the suppression of the occurrence of jumping.

In Comparative Example 4, the groove depth (Hp) of the pulley groove portion of the driven pulley is less than the tooth height (Hb) of the belt tooth portion. In contrast, in Comparative Example 3, the groove depth (Hp) of the pulley groove portion of the driven pulley is greater than the tooth height (Hb).

Comparing the test results of Comparative Examples 3 and 4 with each other, the "no-water/grit jumping torque $T_1$" in Comparative Example 3 is greater than that in Comparative Example 4. Further, the "water/grit jumping torque $T_2$" in Comparative Example 3 is greater than that in Comparative Example 4 regardless that the non-power transmission side backlash d of the driven pulley is less than that in Comparative Example 4. From these results, it is understood that the ensuring of the gap between the groove bottom of the pulley groove portion of the driven pulley and the tooth tip of the belt tooth portion contributes to the suppression of the occurrence of jumping.

In Comparative Examples 3 and 4, the decrease ratios of jumping torque are substantially the same.

Comparative Examples 5 to 8 have the same condition that the pulley groove portion of the driven pulley is in line contact with the belt tooth portion. In ascending order of Comparative Examples 5, 6, 7, and 8, the non-power transmission side backlash d of the driven pulley is sequentially increased, and the gap between the groove bottom of the pulley groove portion of the driven pulley and the tooth tip of the belt tooth portion is increased.

Comparing the test results of Comparative Examples 5 to 8 with each other, in ascending order of Examples 5, 6, 7, and 8, the "no-water/grit jumping torque $T_1$" and the "water/grit jumping torque $T_2$" are sequentially increased, and the decrease ratio of jumping torque is sequentially decreased.

From the results of Comparative Examples 3 and 4, it is understood that the size of the gap between the groove bottom of the pulley groove portion of the driven pulley and the tooth tip of the belt tooth portion has a small impact on the decrease ratio of jumping torque. Accordingly, it is considered that the decrease ratio of jumping torque is decreased with the non-power transmission side backlash d of the driven pulley is increased.

The present invention has been described in detail with reference to the specific embodiments, but it is apparent to one skilled in the art that various forms of changes or modifications can be made without departing from the spirit and the scope of the present invention.

The present application is based on Japanese Patent Application No. 2013-179395 filed on Aug. 30, 2013, the content of which is incorporated herein by reference.

DESCRIPTIONS OF REFERENCE NUMERAL AND SIGNS

1: TOOTHED BELT DRIVING DEVICE FOR BICYCLE
2: TOOTHED BELT
3: BELT TOOTH PORTION
5: TOOTH TIP PORTION
6: TOOTH ROOT PORTION
7: TOOTH SIDE PORTION
10: DRIVE PULLEY
11: PULLEY GROOVE PORTION
20, 120: DRIVEN PULLEY
21, 121: PULLEY GROOVE PORTION
A1: FIRST POWER TRANSMISSION REGION
A2: SECOND POWER TRANSMISSION REGION
A3: THIRD POWER TRANSMISSION REGION
C: BELT CENTER LINE
c1, c2: PULLEY CENTER LINE
D1: POWER TRANSMISSION SIDE BACKLASH OF DRIVE PULLEY
D2, D3: POWER TRANSMISSION SIDE BACKLASH OF DRIVEN PULLEY
d1: NON-POWER TRANSMISSION SIDE BACKLASH OF DRIVE PULLEY d2, d3: NON-POWER TRANSMISSION SIDE BACKLASH OF DRIVEN PULLEY
H: TOOTH HEIGHT
h1, h2, h3: GROOVE DEPTH
L1: FIRST REFERENCE CIRCLE
L2: SECOND REFERENCE CIRCLE
L3: THIRD REFERENCE CIRCLE

The invention claimed is:

1. A toothed belt driving device for bicycle comprising:
a toothed belt that is formed of a rubbery elastic body into which a tension member is embedded along a belt longitudinal direction, and that has a plurality of convex-shaped belt tooth portions disposed with a predetermined tooth pitch along the belt longitudinal direction;
a drive pulley having pulley groove portions that are formed on an outer circumferential surface thereof so as to mesh with the belt tooth portions; and
a driven pulley having pulley groove portions that are formed on an outer circumferential surface thereof so as to mesh with the belt tooth portions;
wherein:
in a cross-section perpendicular to a width direction of the belt, each of the belt tooth portions is formed to be substantially symmetrical to a straight line in a thickness direction of the belt,
in a drive state, the pulley groove portion of the drive pulley is in surface contact with a portion of a surface of the belt tooth portion, which is positioned opposite to a traveling direction of the belt, and the pulley groove portion of the driven pulley is in surface contact with a portion of a surface of the belt tooth portion, which is positioned toward the traveling direction of the belt,
the portion of the belt tooth portion in surface contact with the pulley groove portion of the drive pulley, and the portion of the belt tooth portion in surface contact with the pulley groove portion of the driven pulley are present in a range positioned closer to a tooth root portion of the belt tooth portion than a reference circle which has a diameter obtained by subtracting a tooth height of the belt tooth portion from a respective outermost diameter of the drive pulley and the driven pulley, each of the reference circles being concentric with the respective pulley; and the portion of the belt tooth portion in surface contact with the pulley groove portion of the drive pulley, and the portion of the belt tooth portion in surface contact with the pulley groove portion of the driven pulley are curved in the cross-section perpendicular to the width direction of the belt,
in a drive state, a gap on the reference circle between the pulley groove portion of the drive pulley and the surface of the belt tooth portion, which is positioned opposite to the traveling direction of the belt, and a gap on the reference circle between the pulley groove portion of the driven pulley and the surface of the belt tooth portion, which is positioned toward the traveling direction of the belt, are 0% or more and 0.5% or less of the tooth pitch of the belt tooth portions,
in a drive state, the maximum value of the shortest distance between the pulley groove portion of the drive pulley and the surface of the belt tooth portion, which is positioned toward the traveling direction of the belt, is 2% or more and 6% or less of the tooth pitch of the belt tooth portions,
in a drive state, the maximum value of the shortest distance between the pulley groove portion of the driven pulley and the surface of the belt tooth portion, which is positioned opposite to the traveling direction of the belt, is 10% or more and 18% or less of the tooth pitch of the belt tooth portions, and
a groove depth of the pulley groove portion of the driven pulley is greater than the tooth height of the belt tooth portion, and the difference therebetween is 5% or more of the tooth height of the belt tooth portion.

2. The toothed belt driving device for bicycle according to claim 1, wherein
in the cross-section perpendicular to the width direction of the belt, the pulley groove portion of the driven pulley is asymmetrical to any straight line of a pulley radial direction.

3. The toothed belt driving device for bicycle according to claim 1, wherein
in a cross-sectional shape perpendicular to the width direction of the belt, a tooth tip of the belt tooth portion is formed linearly to extend in the belt longitudinal direction.

4. The toothed belt driving device for bicycle according to claim 1, wherein
the tension member comprises a carbon fiber.

5. The toothed belt driving device for bicycle according to claim 1, wherein
the rubbery elastic body at least comprises a thermosetting urethane elastomer.

6. The toothed belt driving device for bicycle according to claim 1, wherein
the rubbery elastic body has a JISA hardness of 90 or higher.

* * * * *